United States Patent [19]

Fontana

[11] 3,792,712

[45] Feb. 19, 1974

[54] ANTI-THEFT DEVICE FOR FUEL LINE FROM FUEL TANK OF MOTORCYCLES, CARS OR OTHER VEHICLES

[75] Inventor: Toriddo Fontana, Bologna, Italy

[73] Assignee: S.p.A. (Fabbrica Accessori Auto Bolognese), Bologna, Italy

[22] Filed: Apr. 10, 1972

[21] Appl. No.: 242,356

[30] Foreign Application Priority Data
Apr. 29, 1971 Italy ................................. 3414 A/71

[52] U.S. Cl. ................ 137/384.2, 137/385, 70/188, 70/242
[51] Int. Cl. .......................................... C16k 35/06
[58] Field of Search 137/351, 354, 383, 384.2, 384.4, 137/384.6, 384.8, 385; 70/175, 188, 189, 242, 243, 244

[56] References Cited
UNITED STATES PATENTS
| 998,531 | 7/1911 | Ketelsen | 137/384.2 |
| 1,500,449 | 7/1924 | Griffith | 137/384.6 X |

FOREIGN PATENTS OR APPLICATIONS
| 548,233 | 9/1956 | Italy | 137/384.2 |
| 1,801,760 | 6/1970 | Germany | 70/188 |

*Primary Examiner*—Alan Cohan
*Assistant Examiner*—Gerald A. Michalsky

[57] ABSTRACT

Anti-theft device for isolating and reconnecting the pipe line leading, in particular, from the fuel tank of motorcycles, cars and other vehicles, by means of which the danger is eliminated both of fuel being removed through the said pipe line and of the vehicles themselves being stolen.

1 Claim, 4 Drawing Figures

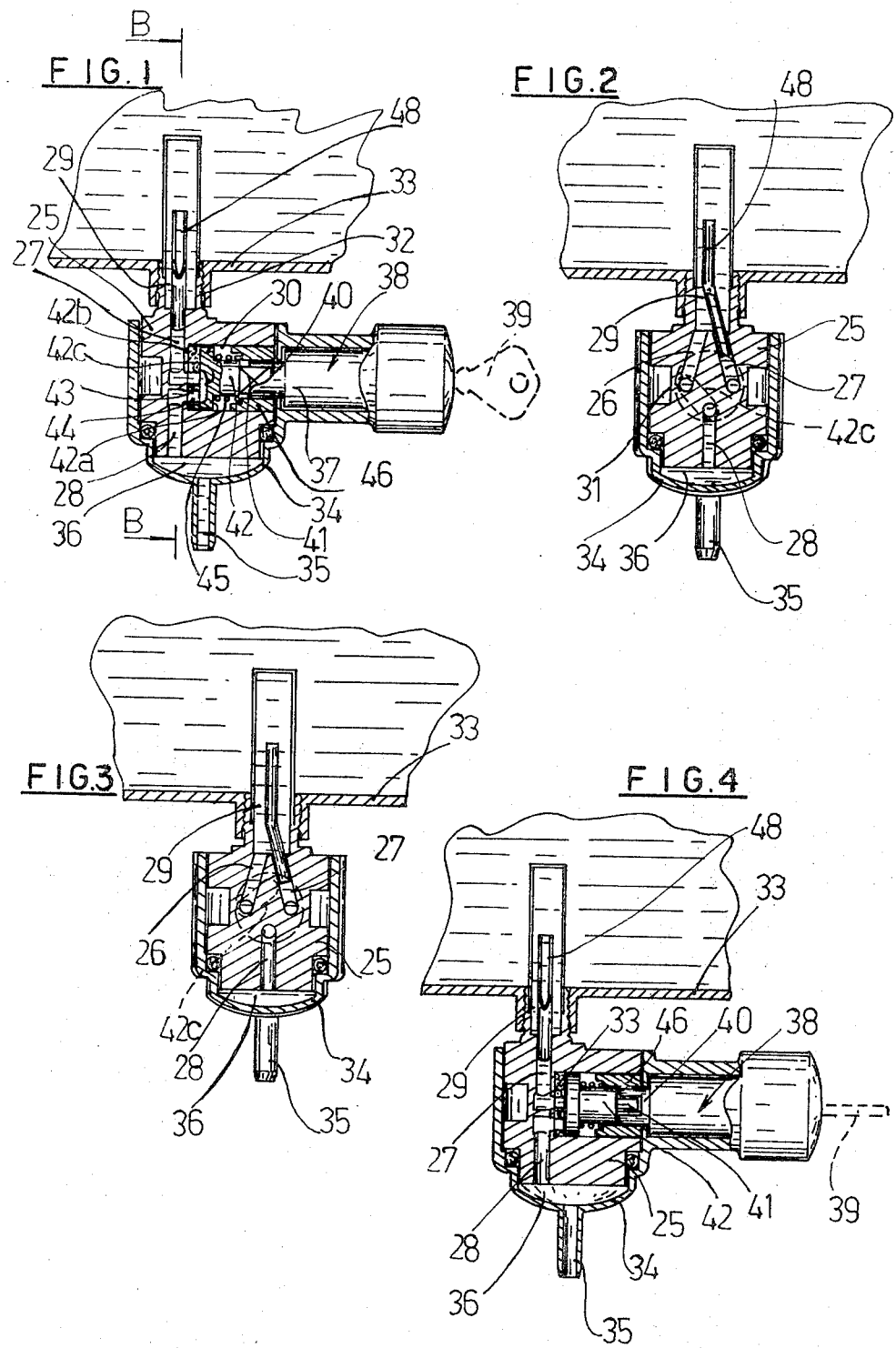

ANTI-THEFT DEVICE FOR FUEL LINE FROM FUEL TANK OF MOTORCYCLES, CARS OR OTHER VEHICLES

This invention relates to an anti-theft device for isolating and reconnecting the pipe line leading, in particular, from the fuel tank of motorcycles, cars and other vehicles.

It is known that insofar as tanks carrying fuel on motorcycles, cars and other vehicles are concerned, the tanks are provided with a mouthpiece and that the said mouthpiece is sealed by a special plug with key fitting into it, thereby preventing fuel from abusively being removed via the said mouthpiece.

Again in the field of motorcycles, cars and other vehicles, the use is known of anti-theft devices which generally either work in conjunction with the horn or by locking the steering mechanism of the motorcycles, cars and other vehicles, so preventing them from being turned.

It has been found, particularly as regards motorcycles and "motor scooters", that the said anti-theft devices do not fully attain the required objective since they can easily be manhandled and it is not at all difficult, on the said vehicles, to drain the fuel contained in the tanks by using the fuel on/off taps or by dismantling the pipe line leading from the petrol tank on the vehicles in question, to the carburettor. After numerous studies carried out in this connection, a device has been designed, which is the subject of the invention, by means of which the danger is eliminated both of fuel being removed through the said pipe line and of the vehicles themselves being stolen.

The subject of this invention is, therefore, an anti-theft device which makes it possible to isolate and reconnect the pipe line leading, in particular, from the fuel tank of motorcycles, cars and other vehicles, an essential feature of this device being that it comprises: a first body suitable to be fixed to the pipe line of the tank and this internally has one or more passages connecting with the said pipe line; a second body, virtually tubular in shape, which fits over the first body and is able to rotate around it, this second body being provided with a chamber able to house a key operated rotatable device and having a discharge pipe for placing the inner chamber of the first body in communication with the outside; a third body operating inside the first body, subjected to the action of the rotatable device and able to alternatively place the passage or passages in the first body, in contact with the discharge pipe in the second body or to preclude any flow of liquid from the passage or passages in the first body, this third body serving, moreover, when in a determined position, to lock the second body to the first body.

The device forming the subject of the invention will now be described and explained with particular reference to a preferred embodiment, using the accompanying drawings, wherein:

FIG. 1 illustrates the device, with certain parts cutaway, shown in a general view in a preferred embodiment and in a first position;

FIG. 2 illustrates the device shown in FIG. 1 with a cutaway along B — B on FIG. 1 and in a second position;

FIG. 3 illustrates the device shown in FIG. 2, with the same cutaway but in a third position;

FIG. 4 illustrates the device shown in FIG. 1, with the same view and cutaway but in the position shown in FIG. 3.

According to the preferred embodiment illustrated in FIGS. 1, 2, 3 & 4, the first body 25, virtually cylindrical in shape, has three internal passages 26, 27 & 28, two of which, that is to say 26 & 27, communicate with a chamber 29 on the upper extremity of the said first body whilst the passage 28 connects with the lower outside of the first body 25.

The said passages 26, 27 & 28 also communicate with a chamber 30 in the said first body 25 in such a way that their inlet mouths communicating with the said chamber lie on one and the same plane and are disposed triangularly (see FIG. 2).

The first body 25 has a circumferential taper 31 and is provided with a threaded union 32 with which it is coupled to the tank 33.

A second body 34 is provided for the device in question and this is virtually of elbow shape and fits over the first body 25 and is able to rotate around it. This has a discharge spout 35 communicating with a chamber 36 formed between the first body 25 and the second body 34 which connects with the passage 28.

A rotatable cylinder 37 belongs to an operating device 38 contained in a chamber on the second body 34 and is turned by means of a key 39.

One end of the said cylinder 37 is provided with a coupling 40 (see FIGS. 1 and 3), the inside of which engages with the extremity 41 of a valve 42 (third body) which is able, as will be seen later on, to place or not to place the various passages 26, 27 & 28 in communication.

Fundamentally the essential part of the said valve consists of a disc 42a, on the face of which 42b there is a groove 42c.

The face 42a of the said valve 42 presses against a sealing disc 43 fixed to the bottom wall of the chamber 30 and is provided with three holes 44, each of which is drilled at a point corresponding to the communicating mouths of the passages 26, 27 & 28 with the aforementioned chamber 30.

The valve 42 is kept pressed against the said disc 43 by a spring 45 exerting pressure on it and on a bush 46 inserted inside the chamber 30 whose task is to guide the valve.

The coupling 40 acts, furthermore, as the means for fastening the second body 34 to the first body 25 and for preventing, once the device has been assembled, the second body 34 from being removed from the first body 25.

With reference to the foregoing, a description will now be given of the operation of the aforementioned device.

Through the operating device 38 and by means of the key 39, the cylinder 37 is made to rotate in a clockwise or in a counter clockwise direction which causes the valve 42 to rotate and, as a consequence of this, determines a desired position of the groove 42c in relation to the communicating mouths of the passages 26, 27 & 28 with the chamber 30, thereby enabling the following work phases to be initiated:

a. (see FIG. 1). In this phase, the groove 42c places the passage 27 in communication with the passage 28 and the liquid flows from the tank, via the pipe 43, the passage 27, the groove 42c, the passage 28, the chamber 36 and the spout 35 and is discharged outside the tank.

(see FIG. 2). (Discharge of liquid from the "reserve" tank). During this phase, the groove 42c places the passage 26 in communication with the passage 28 and the liquid flows from the tank, through the chamber 29, the passage 26, the groove 42c, the passage 28 and the spout 35 and is discharged outside the tank.

c. (see FIGS. 3 and 4). There is no communication in this phase between the passages 26, 27 & 28 and thus the liquid is precluded from being discharged from the tank in which it is held and, in addition to this, when in the said position and on account of the position in which the coupling 40 finds itself, the second body 34 is free to rotate around the first body 25, thereby preventing any attempt to unscrew the device from the tank.

With reference to FIG. 1 and to phase (a), as a result of the particular position in which the coupling 40 is located, the second body 34 is unable to rotate around the first body 25 and thus the said second body 34 is locked to the first body 25, thus permitting the device to be fixed.

As is obvious from the preferred embodiment, during phase (c) when liquid is precluded from being discharged from the tank, the second body of the device is free to rotate around the first body fixed to the tank and this prevents the device from being unscrewed or otherwise removed from the tank, thereby stopping, in this way, any abusive removal or discharge of the liquid from the supply pipe.

The above described embodiment is, of course, given purely as examples and it is, therefore, obvious that any modifications or variants of a constructional nature made to the invention fall within the framework of the under mentioned claim.

What we claim is:

1. An anti-theft device for isolating and reconnecting the flow of fuel in a fuel line between a fuel tank and the engine driven vehicle operated by fuel from a tank comprising:

a first body generally cylindrical in shape having an upper portion defining an upper cylindrical chamber, a central cylindrical portion defining a central chamber, a lower passage below said central portion;

two divergent passageways between said upper cylindrical chamber and said central chamber, the inlets of said divergent passageways from the fuel tank coverging toward each other at said upper cylindrical chamber and the outlets from the fuel tank diverging away from each other and said outlets lying in the same plane in said central chamber;

a third passageway communicating between said lower passage and said central chamber;

a second tubular body which fits over said first body is provided with a spout and is able to rotate about said first body;

means for locking said second body to said first body, said locking means comprising a key operated rotatable valve means in said second body;

said valve means including a disc, a groove on the face of said disc and a seal for the bottom of said central chamber; and, said first body having three spaced apart apertures lying in the same plane as the two outlets of said divergent passageways and the outlet of the third passageway whereby rotation of said valve disc provides communication between one of the divergent passageways and the third passageway for fuel flow from the upper cylindrical chamber through the central chamber and out of the spout.

* * * * *